May 9, 1933.  P. O. FARNHAM ET AL  1,907,768

AUDION DETECTOR CIRCUIT

Filed July 20, 1929

Inventors:
Paul O. Farnham,
Raymond Asserson,
By Byrnes, Townsend & Brickenstein,
Attorneys Patented May 9, 1933

1,907,768

UNITED STATES PATENT OFFICE

PAUL O. FARNHAM AND RAYMOND ASSERSON, OF BOONTON, NEW JERSEY, ASSIGNORS, BY MESNE ASSIGNMENTS, TO RADIO CORPORATION OF AMERICA, OF NEW YORK, N. Y., A CORPORATION OF DELAWARE

AUDION DETECTOR CIRCUIT

Application filed July 20, 1929. Serial No. 379,762.

This invention relates to audion detector circuits and particularly to a circuit for use with an audion of the screen-grid type.

Audions of the commercial screen-grid types have been proposed for use in detector circuits, but such circuits have been open to the objection that the maximum undistorted output was limited to relatively low values. With grid bias detection, overloading in the input circuit could be postponed by increasing the negative bias on the control grid, but for strong signals the flow of plate current limited the maximum output voltage. The average plate voltage is reduced by the potential drop across the coupling resistance in the plate circuit, usually of the order of one-half megohm, and overloading occurs when the minimum instantaneous value of the plate voltage falls approximately to the screen-grid voltage.

An object of the present invention is to provide a method of and circuit for extending the effective operating range of a screen-grid detector. A further object is to provide a method of and circuit for automatically maintaining a proper operating margin between the voltages on the plate and screen-grid of an audion detector. More specifically, an object is to provide a detector stage in which the effective operating range is increased by the provision of a resistance in the screen-grid circuit, the resistance being of such magnitude that the screen-grid voltage drops automatically with increasing signal strength.

Figure 1:
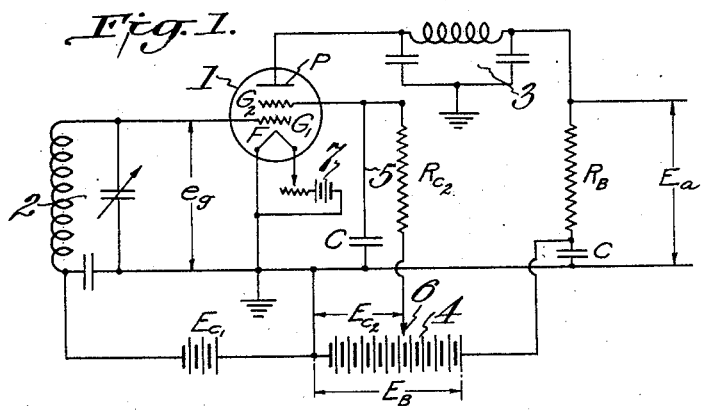
Figure 2:
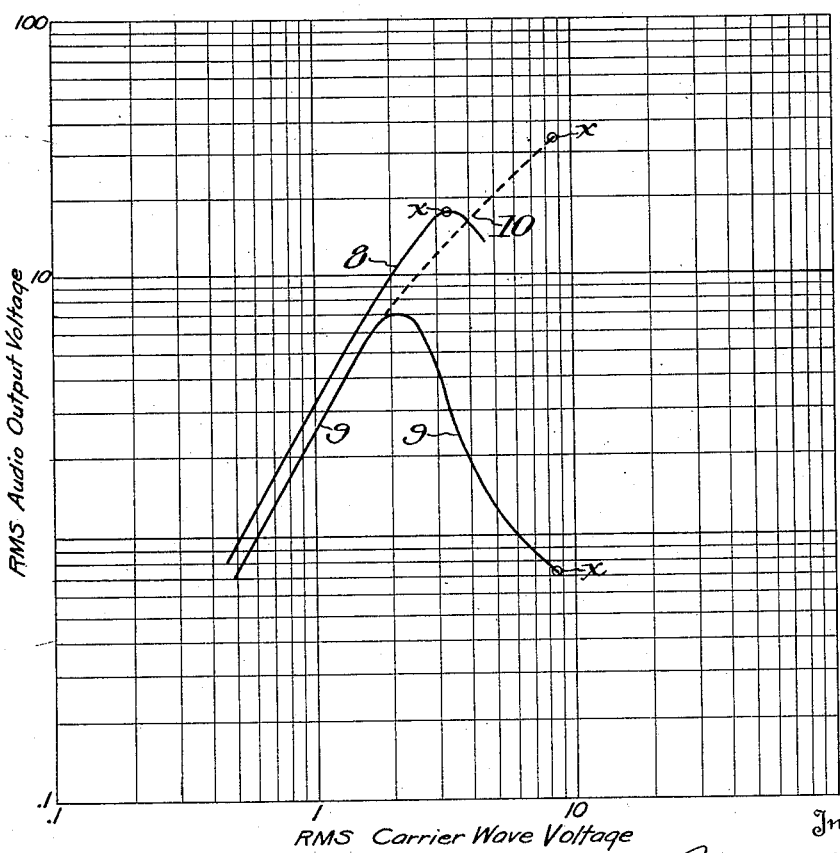

These and other objects of the invention will be apparent from the following specification, when taken with the accompanying drawing, in which Fig. 1 is a circuit diagram of a detector stage embodying the invention, and Fig. 2 shows characteristic curves denoting the relationship between signal strength and audio voltage output.

In the drawing, the reference character 1 indicates an audion of the screen-grid or tetrode type having a tuned input circuit 2 connected bewteen the control grid $G_1$ and the cathode F. The lower terminal of the inductance of the tuned circuit is connected to the cathode through the grid bias battery $E_{c1}$, and the output circuit between plate P and cathode F includes the radio frequency choke and grounding condensers 3, the coupling resistance $R_B$ and the plate battery 4, the battery being preferably shunted by by-pass condenser C. The screen grid $G_2$ is connected to an intermediate point of the battery 4 by the lead 5 which preferably terminates in an adjustable tap 6 for connection to any desired point along the battery. A condenser C of large capacity is connected between the grid $G_2$ and the ground, and the cathode F is energized by any suitable means, such as the battery 7.

The circuit as so far described is of conventional form, and the maximum strength of signal which may be impressed upon the detector stage is limited by the value of the grid bias voltage, or by the relative values of the battery potential $E_B$ and $E_{c2}$ which are applied to the plate and screen-grid respectively.

In accordance with the present invention, a resistance $R_{c2}$ is included in the screen-grid lead 5 and its value is so chosen that with increasing signal strength, the current flow in the screen-grid circuit decreases the screen-grid potential at substantially the same rate as the average voltage on the plate is decreased by the current flow in the coupling resistance $R_B$.

The effect of the added resistance $R_{c2}$ will be apparent from a consideration of the characteristic curve of Fig. 2. The data for all of the curves were obtained from detector stages employing tetrodes of the type known commercially as "UX-222", the coupling resistance $R_B$ having a value of one-half megohm, and the plate battery voltage $E_B$ being 135 volts. In each of the measurements, the modulation of the carrier wave was 30%.

Curve 8 represents the relation between the RMS carrier wave voltage $E_g$ and the RMS audio output voltage $E_a$ for a detector stage of conventional design. The screen-grid circuit did not include the resistor $R_{c2}$, the control grid bias was −6 volts, the screen-grid being connected to the 30 volt tap of the battery 4. It will be noted from the shape of the characteristic curve 8 that the audio output varies approximately as the second power of the applied carrier wave voltage up to the point $x$ and that for increasing values of carrier beyond this point the audio voltage drops abruptly. Under conditions corresponding to the point $x$, the input circuit drew grid current, and furthermore the instantaneous value of the plate voltage fell to or below the voltage $E_{g2}$ on the screen-grid. The maximum output is thus determined by this point $x$ at which overloading occurs and reaches the value of 17 volts for an impressed voltage $E_g$ of about 3 volts.

The solid line curve 9 represents the observed operation of the same detector stage when the bias on the control grid $G_1$ was increased to $-15$ volts and, for maximum sensitivity, the tap 6 was shifted to the 75 volt terminal of the battery 4. It will be noted that the point $x$ at which the control grid draws current has been shifted far beyond the point of inflection of the curve, i. e., the point at which the plate circuit is overloaded.

The increased potentials on the grids prevented grid circuit overloading but the maximum output voltage was decreased from about 17 volts to 7 volts.

The curve comprising the left branch of the solid line curve 9 and the dotted line curve 10 represent the operation of the detector stage when a resistance $R_{c2}$ of the value of one-half megohm was inserted in the screen-grid circuit, the control grid voltage remaining $-15$ volts and the tap 6 being shifted to the 85 volt terminal of the battery 4, the increased voltage of the screen-grid battery counteracting the potential drop across the resistance $R_{c2}$ to leave the initial screen-grid potential $E_{g2}$ at substantially the same value as that previously obtained when the grid $G_2$ was connected directly to the 75 volt battery terminal. The point $x$ at which the grid circuit overloads is not affected by the introduction of the resistance in the screen-grid circuit but falls at the same value, approximately 9 volts, of the input voltage $E_g$. The added resistance $R_{c2}$ automatically maintains an operating voltage margin between the plate and screen-grid voltages such that overloading in the plate circuit does not occur within the signal energy range permitted by the value of control grid bias. The maximum output voltage is now determined by control grid current and is approximately 34 volts. The automatic variation of screen-grid potential with increasing signal strength has therefore extended the maximum output voltage from 7 to 34 volts and, in comparison with the more usual detector circuit employing lower voltages on the grids, has doubled the maximum output voltage.

It will be further noted from an examination of the characteristic curve 10 that the audio output voltage varies as the first power to the applied carrier voltage over an extended range of output. This range of output over which linear operation is obtained is furthermore the useful operating range of the device, since it corresponds to the region of maximum detector output. This range of linear operation obtains over practically the entire extended range of operation from an audio output of 7 volts to the output at overload of 34 volts.

It is to be understood that the invention is not limited to audion detectors of the UX—222 type, nor is it limited to the particular values of circuit constants which have been mentioned in connection with one particular embodiment of the invention. The invention is applicable to all types of screen-grid detectors and persons familiar with the design and construction of audion amplifier and detector circuits will experience no difficulty in determining the circuit constants which should be employed with any particular type of tube for the purpose of maintaining the desired voltage margin between the plate and screen-grid potentials.

Although we have described a circuit in which the overloading of the plate circuit has been postponed to such an extent that the maximum output voltage is determined by grid circuit overloading, it will be apparent that the invention is not limited to the use of circuit elements of such values that the control grid bias determines the maximum permissible signal energy. The invention contemplates the employment of circuit elements of such relative values that the effective operating range of the detector is extended.

When the coupling impedance takes the form of an inductance or audio frequency choke coil, the average plate voltage does not fall off appreciably with increasing audio output, but the audio frequency variations in plate current may carry the instantaneous value of the plate voltage to or below the potential on the screen-grid. The invention is therefore useful in screen-grid amplifiers employing inductive coupling, since it postpones the point of plate circuit overloading and provides an extended region in which the audio response is a linear function of the radio frequency input.

We claim:

1. In the operation of a screen-grid detector, the method of deferring overloading in the plate circuit which comprises automatically decreasing the screen-grid potential as the signal strength increases.

2. In the operation of a screen-grid detector as an anode rectifier, the method which comprises producing in the screen-grid circuit a voltage drop which reduces the average screen-grid potential to a value less than the instantaneous plate voltage.

3. In the operation of a screen-grid detector as an anode rectifier having a resistive load in the plate circuit thereof, the method of deferring overloading in the plate circuit which comprises producing in the screen-grid circuit a voltage drop proportional to, and at all times greater than, the voltage drop across the resistive load in the plate circuit.

4. In the operation of a screen-grid detector, the method of providing an extended range throughout which the response is substantially linear, which comprises automatically reducing the screen-grid voltage as the signal strength increases.

5. In the operation of a screen-grid detector the method which comprises impressing upon the several elements of said detector voltages of the respective magnitudes required for detection, impressing upon said detector signal energy of an order such that plate circuit overloading would occur if the screen-grid voltage remained unchanged, and automatically reducing said screen grid voltage in accordance with increasing signal strength.

6. A detector stage of the type including an audion having a cathode, control grid, anode and a second grid; and means for impressing on said second grid and anode direct current voltages which are positive with respect to the cathode voltage, characterized by the fact that means is provided for automatically reducing the instantaneous value of the positive voltage on said second grid as the signal strength increases, said means comprising a resistance in the circuit between second grid and cathode, and means impressing upon the control grid a negative bias suitable for grid bias detection.

7. A detector stage comprising an audion of the screen-grid type, an input circuit connected between control grid and cathode, an output circuit including a coupling resistance connected between cathode and anode, a circuit between screen-grid and cathode including a resistance of the same order of magnitude as said coupling resistance, means providing positive potentials on said screen-grid and plate, and means impressing upon said control grid a negative bias appropriate for grid bias detection.

8. In a detector stage, an audion of the screen-grid type having its grid circuit arranged for anode rectification, a source of current and a load in the plate circuit of said audion, and a circuit including a source of current and a resistance serially connected between the screen-grid and cathode of said audion, the magnitude of said resistance being such that, with increasing strength of signals, the instantaneous voltage drop across said resistance reduces the screen-grid voltage below the minimum value of the instantaneous plate voltage.

9. In a detector stage, an audion of the screen-grid type having its grid circuit arranged for anode rectification, a source of current and a resistive load in the plate circuit of said audion, and a circuit including a source of current and a resistance serially connected between the screen-grid and cathode of said audion, the magnitude of said resistance being such that, with increasing strength of signals, the instantaneous voltage drop across said resistance increases at substantially the same rate as the voltage drop across said plate circuit load.

10. In a detector stage, a screen-grid tube having its grid circuit arranged for anode rectification, a source of current and coupling impedance in the plate circuit of said tube, and a source of current and a resistance serially connected between the screen-grid and cathode of said tube, the magnitude of the resistance being such that for signal energy above a predetermined value, the audio response is substantially a linear function of the signal energy.

11. In combination, in a linear power detector stage, a screen grid tube, a tunable input circuit adapted to have a wide range of radio frequency voltages impressed thereon connected between the cathode and control grid of the tube, a source of anode potential, a load circuit connected between the anode of the tube and a point of positive potential of said source, means for negatively biasing the control grid, and a path between the screen grid of the tube and a point on said source of less positive potential than said first point, said path including an impedance of such magnitude that the range of linear operation of the detector obtains over said wide range of voltages without overloading of the load circuit.

In testimony whereof, we affix our signatures.

PAUL O. FARNHAM.
RAYMOND ASSERSON.